Aug. 6, 1963

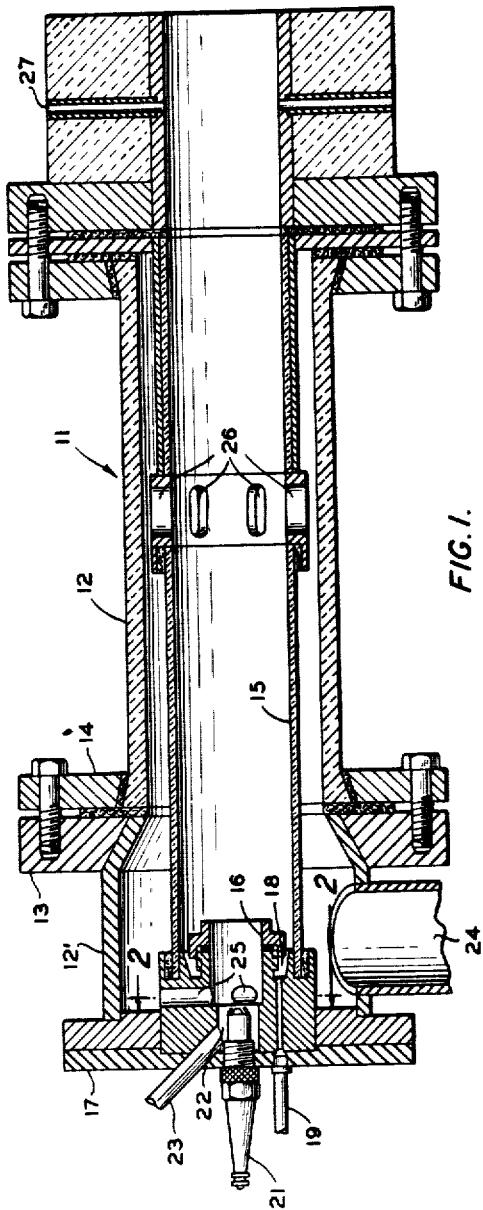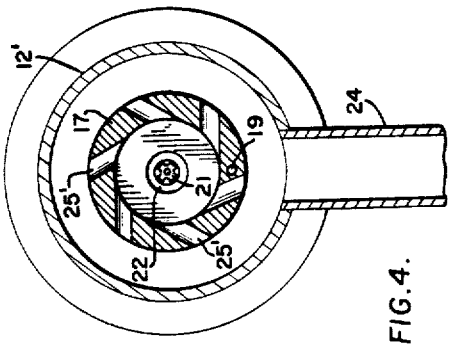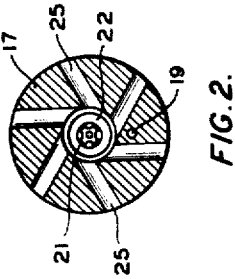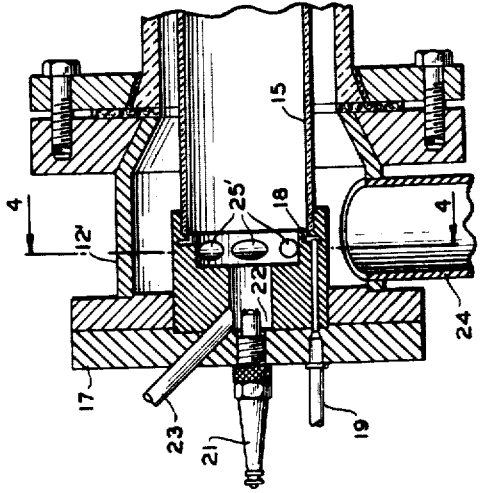

R. M. SCHIRMER 3,099,910

APPARATUS FOR BURNING FUEL AT SHEAR INTERFACE
BETWEEN COAXIAL STREAMS OF FUEL AND AIR

Original Filed Aug. 11, 1955

INVENTOR.
R. M. SCHIRMER

BY
Young Jugg
ATTORNEYS

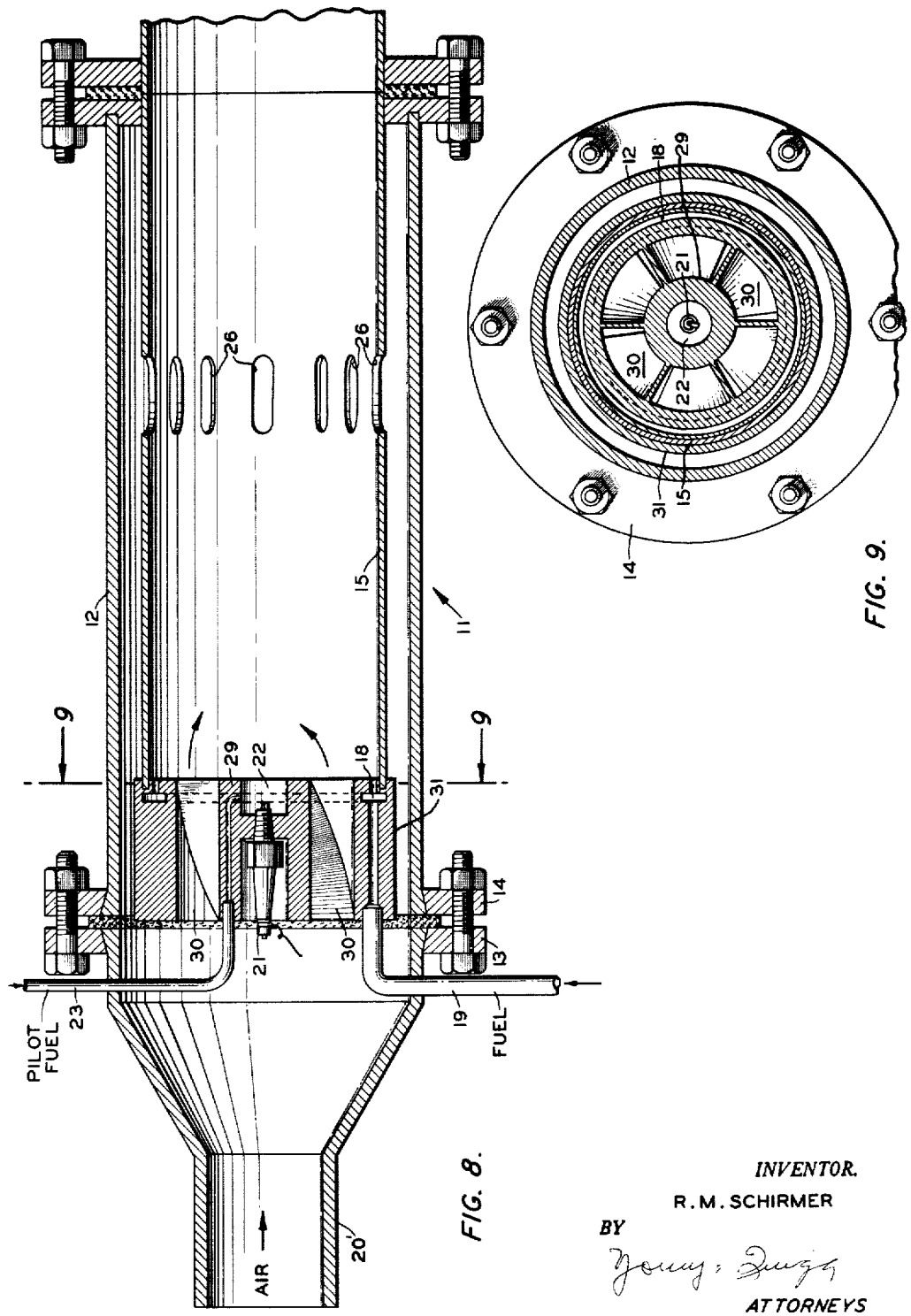

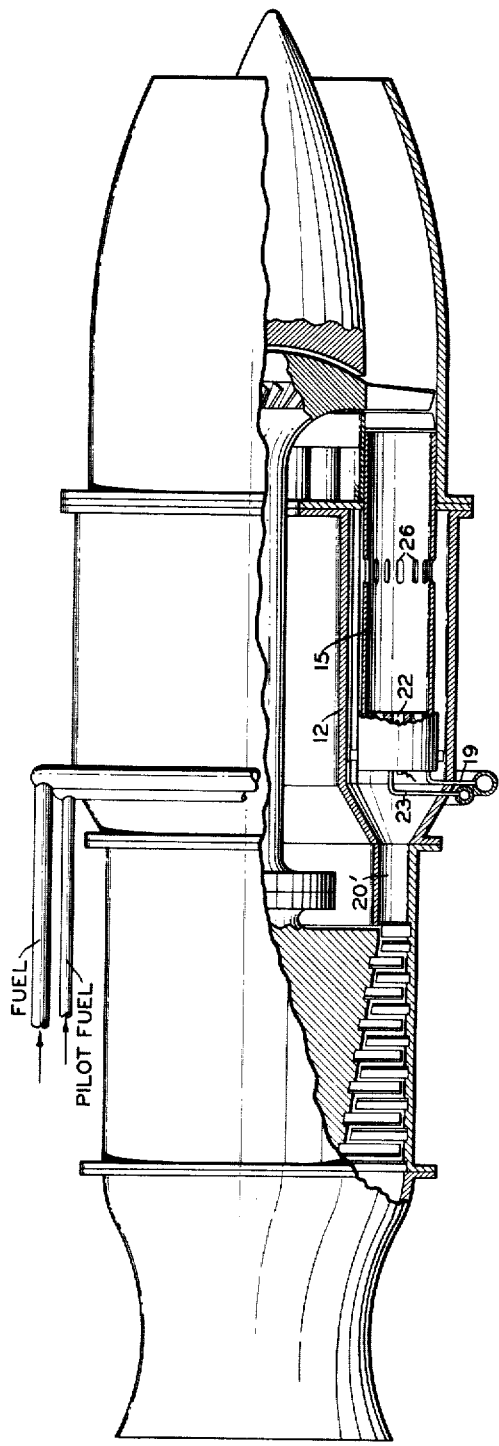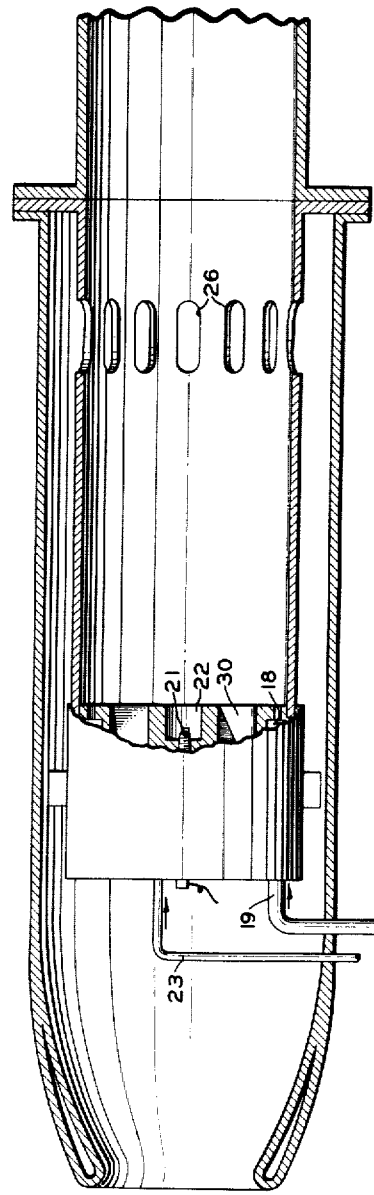

United States Patent Office 3,099,910
Patented Aug. 6, 1963

3,099,910
APPARATUS FOR BURNING FUEL AT SHEAR INTERFACE BETWEEN COAXIAL STREAMS OF FUEL AND AIR
Robert M. Schirmer, Bartlesville, Okla., assignor to Phillips Petroleum Company, a corporation of Delaware
Original application Aug. 11, 1955, Ser. No. 527,839. Divided and this application Apr. 26, 1962, Ser. No. 190,345
11 Claims. (Cl. 60—39.74)

This invention relates to improved combustors. In one of its more specific aspects, this invention relates to combustion apparatus. In another of its more specific aspects, it relates to continuous flow combustion apparatus of low pressure drop, high combustion efficiency and high heat release. In another of its more specific aspects, this invention relates to an improved method for producing continuous flow combustion at a high rate of heat release. In another of its more specific aspects, this invention relates to a combustor for jet engines.

This application is a division of my copending application Serial No. 527,839, filed August 11, 1955, which in turn is a continuation-in-part of my copending application Serial No. 346,304, filed April 2, 1953, now abandoned.

In the usual design of combustor apparatus in which a flame is initiated in a stream of high velocity air, some mechanism must be provided to decelerate at least a portion of the stream of air below effective flame velocity in the combustible mixture to pilot and maintain the flame seated in the apparatus. Addition of fuel is made either directly to the high velocity stream of air upstream of the deceleration device or in the region of a quiescent zone downstream of the deceleration device. In the usual turbo-jet engine, combustion is maintained in the flame tube or liner which completely surrounds the flames and apertures in the liner serve for the addition of sufficient air for the formation of a near stoichiometric mixture of fuel and air in its primary combustion zone. The loss of pressure in an apparatus of this type is considerable. In the usual ram jet engine, a restrictive element, usually called a flame holder, is mounted in a stream of high velocity air and combustion is piloted in the quiescent zone downstream from this restriction. In this ram jet apparatus, the magnitude of the pressure drop is usually less than that encountered in the turbojet engine.

In the combustion apparatus commonly employed in gas turbine power plants, it is necessary to achieve stable and efficient combustion of fuel and air at high rates of heat release in a relatively confined space through which a stream of air is moved at high velocity. It is desirable in such a combustion system that the pressure loss be low, that the temperature distribution over the cross-section of flow be uniform and that stable and efficient combustion be obtained over a wide range of fuel-air ratios and severity of inlet conditions.

The following objects will be obtained by at least one of the aspects of this invention.

An object of this invention is to provide an improved combustor. Another object of this invention is to provide an improved method for producing continuous flow combustion at a high rate of heat release. Another object of the invention is to provide an apparatus of low pressure drop in which improved combustion efficiency and stability are obtained. Another object of the invention is to provide an improved combustor which does not require the conventional flame holder. Other and further objects of this invention will be apparent to those skilled in the art upon study of the accompanying disclosure and drawings.

I have now developed a combustion apparatus which provides improved combustion efficiency and stability compared to conventional apparatus with comparable pressure drops. Broadly speaking, my combustor permits the introduction of fuel, preferably vapor, along the wall of the flame tube, and the introduction of the air tangentially into an inner pipe so that the flow of air spirals or swirls down the axis of the burner. Stated another way, my invention provides for maintaining a separate strata of fuel as an annulus through which a swirling mass or vortex of air is passed. When operating a combustor according to the method of my invention separate strata of fuel and air are maintained within the primary combustion zone or flame tube so that burning takes place at the shear interface between the fuel and the air. In contrast to this type of structure and operation, in prior known burners there results substantially complete mixing of the fuel and air and combustion takes place as a ball or column of flame moving down the central portion of the combustion chamber. Heat release, in the order of 20 to 40 million B.t.u./hour/cubic foot/atmosphere and higher have been obtained at overall flow velocities up to 250 feet per second in the operation of my combustor. This burner has particular application in operations where high heat release is required, such as in gas turbines, turbo-jets, ram jets, furnaces, and the like.

The operation of a jet engine, such as those employed in aircraft, is dependent upon the utilization of the thermal energy released in the engine burner. The combustion of fuel and air in the burner gives the molecules of the gases high kinetic energy. These gases are ejected from the combustion chamber at a high velocity, resulting from the high kinetic energy provided by the thermal energy, and thrust is thereby applied to the aircraft. Thus the performance of a jet engine can be limited by its ability to obtain high heat release under all operating conditions. The improved burner of my invention has particular application in operations where high heat release is required, such as in gas turbines, ram jets, furnaces, and the like.

In my combustion apparatus, all of the air may be used as primary air, or part of the air may be used for secondary air, depending upon the need and adaptation of the burner. Primary air is admitted through a plurality of tangential openings into the flame tube. Preferably, these openings are tangential to the flame tube or to an inner short length of pipe and allow the injected primary air to make a tangential jet into the larger flame tube; said openings are located around the periphery of the flame tube or around the periphery of said inner short length of pipe located immediately upstream from the flame tube. In another preferred embodiment the air can be admitted coaxially to the flame tube through swirl vanes so as to produce a swirling mass of air spiraling coaxially and helically through the flame tube. These methods provide a swirling and spiralling flow of air down the axis of the burner and provide for the supply of the right amount of air to the fuel over a considerable operating range so as to rigidly control fuel residence time, limiting pyrolytic carbon formation as is normally desired for jet engine operation.

The fuel, preferably vaporized, is injected into an annular space at the inner surface of the flame tube and flows down the inner wall of the flame tube. Any fuel which may be prevaporized is particularly suitable for use in this burner. A liquid or even a solid fuel may be used in the proper modification of the apparatus. When using a liquid fuel, it may be desirable to use a plurality of atomizing nozzles to form a fine mist for spraying in the annular space and to provide flow of the fuel down the wall of the flame tube. A solid fuel should preferably exist in a very finely divided state.

The method of introduction of air and fuel in my burner provides a tangential core of air which swirls through an annulus of fuel, preferably prevaporized, with mixing being accomplished at the extensive shear interface between the fuel and air streams. In my burner the wall of the flame tube is blanketed with said annulus of fuel. Thus, full advantage is taken of the radiant energy of the flames to preheat, and perhaps pyrolyze, the fuel. It may be that such fuel preheating and pyrolysis produces materials having a high flame-speed, i.e., materials such as hydrogen, acetylene, ethylene, etc., which stabilize combustion. Combustion apparently is effected at the highly turbulent shear interface between the fuel and the air, and therefore the combustion occurs near the periphery of the flame tube and in the mixing zone at said interface. The characteristics of controlled fuel residence time and organized air turbulence with intense mixing at the shear interface along the flame tube provides a superior performance burner. This arrangement in the burner apparently provides for the supply of a combustible fuel-air mixture over a wide operating range as evidenced by the constant and high value of combustion efficiency obtained. The amount of heat release per unit volume of combustion chamber that can be obtained with my improved combustion method and apparatus is at least ten fold that of conventional burners now commonly employed.

In addition to the higher heat release obtained, my burner is superior to known burners in that it deposits less carbon in the flame tube and forms less smoke than do other burners. In fact, fuels now generally considered unsatisfactory because of their carbon deposition tendencies, e.g. benzene etc., can be burned satisfactorily in my burner. A sub-critical residence time for all the fuel introduced into this burner probably explains the lack of carbon deposition on the walls of the burner and lack of smoke in the exhaust. Probably insufficient time is allowed for the dehydrogenation and polymerization of the fuel to form carbon particles.

In the drawings, FIGURE 1 is a sectional elevation of an improved combustor of my invention;

FIGURE 2 is a cross-section taken along the line 2—2 of FIGURE 1;

FIGURE 3 is a section view showing a modification of the combustor of FIGURE 1;

FIGURE 4 is a cross-section taken along the line 4—4 of FIGURE 3;

FIGURE 8 is a sectional elevation of another modification of the improved combustor of this invention.

FIGURE 9 is a cross-section taken along the line 9—9 of FIGURE 8.

FIGURE 10 illustrates an application of the combustor of FIGURE 8 in a turbo-jet engine.

FIGURE 11 illustrates an application of a combustor of FIGURE 8 in a ram-jet engine.

Figure 6:
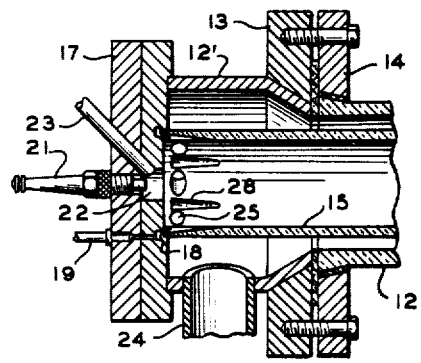
FIGURE 6 is a section view showing a preferred non-step modification of the combustor of FIGURE 1.

Referring particularly to the device shown as FIGURE 1 of the drawing, combustor 11 comprises an outer shell 12 which may be integral with the enlarged upstream end thereof or may be connected to the upstream end portion 12' by means of flange members 13 and 14. Flame tube 15 is coaxially disposed within shell 12 and shell 12', extending from a point within shell 12' to the downstream end of shell 12. Igniter tube 16 is positioned within the upstream end portion of flame tube 15 and is supported therein by closure member 17. Igniter tube 16 is smaller in cross-section than flame tube 15 and extends a short distance into the upstream end of flame tube 15. An annular space 18 is formed between the downstream end of igniter tube 16 and the upstream end of flame tube 15 and is preferably formed so as to direct gaseous materials outwardly against the wall of flame tube 15. Fuel inlet conduit means 19 extends through closure member 17 to the annular space 18, so as to provide means for introducing fuel into the annular space surrounding the igniter tube.

Igniter 21 extends through closure member 17 into the interior of igniter tube 16. An annular space 22 is preferably formed between igniter 21 and the downstream end of closure member 17. Pilot fuel inlet conduit 23 extends through closure member 17 into annular space 22 so as to provide means for introducing pilot fuel into that annular space. Air inlet conduit 24 opens into the annular space formed between shell 12' and flame tube 15. A plurality of primary air inlet conduits 25 extends tangentially from the annular space formed between shell 12' and igniter tube 16 through igniter tube 16 and open into the interior thereof. A plurality of secondary air inlet conduits 26 extends through flame tube 15 at a point downstream of the primary combustion zone. Secondary air inlet conduits 26 communicate with the continuous air passage formed between shell 12' and shell 12 and flame tube 15. If desired, wells are provided for the introduction of thermocouples at points 27 so that constant observation of temperatures can be obtained.

In the operation of the device shown in FIGURE 1 of the drawings, fuel such as the primary fuel or propane is introduced as pilot fuel through conduit 23 into the annular space formed between closure member 17 and igniter 21. Primary air is introduced through conduit 24 and the plurality of tangential primary air inlet conduits 25 into the igniter tube 16 at a point adjacent the downstream end of annular conduit 22. The pilot fuel is ignited in igniter tube 16. The air which is introduced through tangential inlet conduit 25 imparts a helical motion to the gases flowing through igniter tube 16 and into the interior of flame tube 15. Primary fuel is introduced into the annular space 18 from fuel inlet conduit 19. Vaporization may take place in annular space 18 in an indirect heat exchange with the regular flame or the pilot flame. One or more primary fuel inlet conduits can be utilized if desired. If desired the fuel can be prevaporized. The primary fuel is directed slightly outwardly onto the inner wall of flame tube 15 and flows down said wall past the point of introduction of the incoming primary air moving in a helical direction, thus obtaining controlled mixing at the shear interface between said fuel and air. The primary fuel and air mixture is ignited by the burning pilot fuel, after which time the introduction of pilot fuel may be discontinued. By introducing the fuel slightly outwardly against the wall of flame tube 15 and introducing the primary air in a helical motion, controlled mixing of the fuel and air is obtained without the aid of holding means such as a flame holder which would increase the pressure drop through the unit. The combustion efficiency obtained in this type of device is therefore very good.

A portion of the primary air which is introduced through conduit 24 is diverted as secondary air and is introduced into the interior of flame tube 15 downstream of the primary combustion zone. This secondary air acts as a quench, diluting the combustion products to such an extent that additional burning does not occur. The addition of secondary air also tends to even off the temperature of gas phases in the combustor.

The secondary air is not required when the hot combustion gases do not flow to a turbine or other apparatus harmed by high temperatures.

Referring particularly to the device found in FIGURE 3 of the drawings, parts which are like those described in connection with FIGURE 1 of the drawings are indicated by like numerals. In this particular modification, primary air is introduced tangentially into a chamber of about the same cross-section as that of flame tube 15. Primary air inlet conduits 25' extend from the annular chamber formed between shell 12' and flame tube 15 into the interior of an igniter zone which is of inner diameter but slightly smaller than the inner diameter of flame tube 15. Annular space 18 is provided so as to inject primary fuel directly along the wall of flame tube 15. Primary fuel inlet conduit 19 is connected to annular space 18. Introduction of fuel and air in this manner has the same advantageous results as obtained in the one described in connection with FIGURE 1 of the drawing.

When the total fuel is introduced into the combustion chamber axially, as through the pilot fuel inlet conduit, the resulting combustion efficiency is very low at lean fuel-air mixtures. In diverting the introduction of the primary fuel out to the wall of flame tube 15, I have materially increased the combustion efficiency of the burner. My arrangements which allow the air to swirl out of the igniter tube and along the flame tube so as to mix with the fuel, provide for a supply of the right amount of air to fuel over a considerable operating range as illustrated by the constant and high value of combustion efficiency obtained as shown in FIGURE 5 of the drawings.

Figure 5:
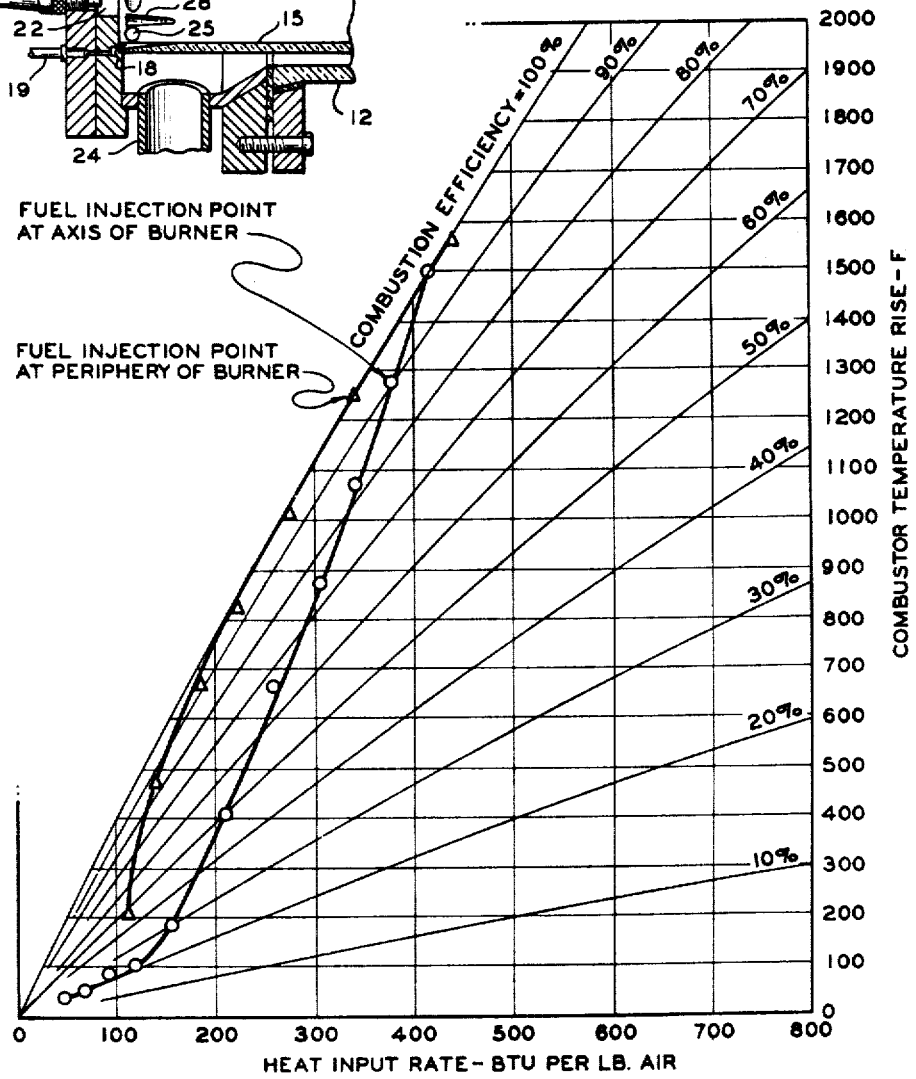
FIGURE 5 is a graphic representation showing a comparison of results when using axial and peripheral fuel input.

A small scale burner having a flame tube inner diameter of about 2 inches and a combustor length of about 1 foot was utilized in obtaining the data set forth in FIGURE 5 of the drawings. An air inlet velocity of 187 feet per second, mass air flow rate of 0.30 lb./sec., inlet static pressure of 40 inches of mercury absolute, an inlet air temperature of 300° F., and inlet temperature of 400° F., and a normal heptane fuel were utilized as conditions of operation in obtaining the data set forth in FIGURE 5. As will be noted, considerably better combustion efficiency was obtained at lean fuel-air ratios when using the annular fuel injection at the wall of a combustor using tangential air inlets, than was obtained when using an axial fuel inlet in such a combustor.

Figure 7:
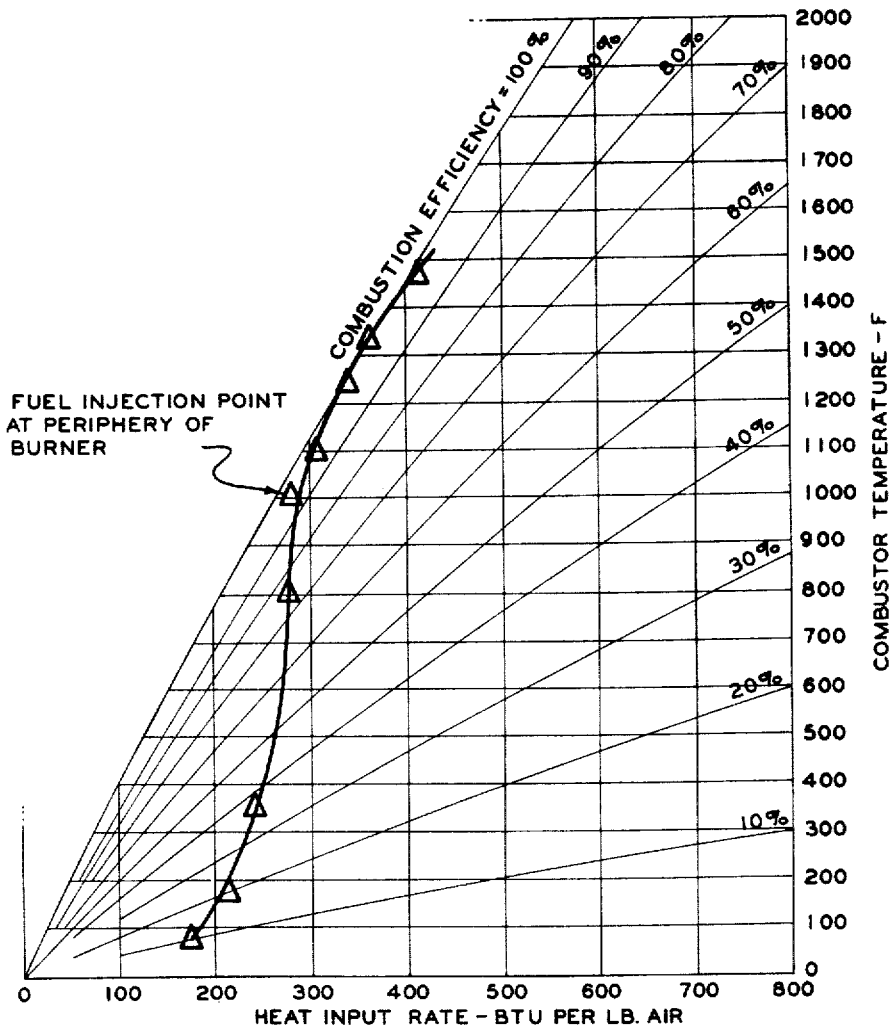
FIGURE 7 is a graphic representation showing the results of burning normal heptane and a burner such as the one shown in FIGURE 3.

A small scale burner having a flame tube inner diameter of about 2 inches and a combustor length of about 1 foot, but utilizing substantially no step, i.e., the interval from the outside of the ignited tube to the inside of the flame tube, was utilized in obtaining the data set forth in FIGURE 7 of the drawings. An air inlet velocity of 171 feet per second, mass air flow rate of 0.30 lb./second, inlet static pressure of 50 inches of mercury absolute, an inlet air temperature of 200° F., an inlet fuel temperature of 400° F., and normal heptane fuel were utilized as conditions of operation in obtaining the data set forth in FIGURE 7. These data also indicate the excellent combustion efficiency which is to be obtained with the improved combustor of this invention.

Although this invention has been particularly described in connection with a combustor utilizing an igniter tube, the use of such a tube is not required. In fact, I have discovered that combustion efficiency is materially improved when the step from the igniter tube to the flame tube is decreased in size. The larger size step results in a back flow within the combustor, which is detrimental to combustion efficiency. One of the problems existing in the operation of conventional jet engines is that combustion efficiency is materially reduced with most conventional engines when utilizing fuels other than a normal-paraffin, i.e., aromatics and the like. I have found that when a device, such as is shown in FIGURE 3 of the drawings, is utilized, the combustion efficiency of aromatics is materially improved over that obtained in the operation of the device set forth in FIGURE 1, despite the fact that the device shown in FIGURE 1 gives a much better combustion efficiency than is obtained with conventional combustors.

In the device shown as FIGURE 6 of the drawings, the igniter tube has been omitted and fuel is injected from the annular space 18 into recesses 28 formed in the wall of flame tube 15, sloping inwardly and in a downstream direction. By introducing the fuel in this manner, the downstream flow of fuel is firmly established before it is contacted with the helical flow of air introduced through conduits 25. It is preferred that the point of fuel introduction be at least as far downstream as the point of introduction of the primary air. However, when utilizing the device of FIGURE 6 of the drawings, wherein the recesses 28 are formed in the wall of the flame tube, the fuel can be introduced into the recesses at a point upstream of the inlets 25 so long as the fuel does not emerge from the recesses until it has passed to points downstream of inlets 25. Recesses 28 are preferably formed between the openings of conduits 25.

Referring particularly to the device shown in FIGURE 8 of the drawings, parts which are like those described in FIGURES 1 and 3 of the drawings are indicated by like reference numerals. In this particular modification, the combustion apparatus comprises an outer shell 12 having a flame tube 15 coaxially disposed within shell 12. The upstream end of flame tube 15 is positioned within annular support member 31 which is suitably supported within said outer shell 12 by suitable means such as rods, not shown. Annular support member 31 forms an annulus between said outer shell and said flame tube. Second support member 29 is coaxially positioned within annular support member 31 so as to form a second annulus between said annular support member and said coaxially positioned member 29. Air inlet 20' is connected to said outer shell 12 by means of flange members 13 and 14. Fuel inlet conduit 19 extends through air inlet 20' and support member 31 to annular space 18 in said support member 31. Pilot fuel conduit 23, which extends through air inlet means 20' and annular support member 31, supplies fuel for ignition purposes to annular space 22 recessed into the downstream side of member 29. Igniter 21 extends through member 29 into said chamber 22 for effecting ignition of a pilot fuel such as propane. Igniter 21 can be of a spark type or other suitable device. Swirl vanes 30, positioned in said second annulus, impart a swirling helical motion to air admitted to flame tube 15 so as to form a swirling mass of air within said flame tube. Said swirl vanes can be of different types such as, for example, air foil sections, a helix along the inner periphery of support member 31, etc. A plurality of secondary air inlet conduits 26 extend through flame tube 15 at a point downstream of the primary combustion zone. Secondary air inlet conduits 26 communicate with the continuous air passage formed between shell air inlet 20', outer shell 12, and flame tube 15.

In the operation of the device shown in FIGURE 8, fuel such as the primary fuel, or a pilot fuel such as propane is introduced as pilot fuel through conduit 23 into annular space 22. Primary air is introduced through air inlet 20' and swirl vanes 30 into the flame tube or combustion chamber. The pilot fuel is then ignited in annular chamber 22 by means of igniter device 21.

Primary fuel, which can be in gaseous or vaporous form, is introduced into annular space 18 by means of fuel inlet conduit 19. Said primary fuel is directed outwardly against and along flame tube 15 so as to form an annulus of said fuel around the periphery of said flame tube. Swirl vanes 30 impart a swirling helical motion to the air introduced into said flame tube, which air travels as a vortex or helically spiraling mass within said annulus of fuel. Said primary fuel and air form a mixture at the interface therebetween, which mixture is ignited by the burning pilot fuel, after which the introduction of pilot fuel can be discontinued. By thus introducing the fuel uniformly along the wall of the combustion chamber or flame tube so as to form an annulus of said fuel around the periphery of said flame tube, and introducing the primary air as a helically swirling mass within said annulus of fuel which travels coaxially and longitudinally of said flame tube, excellent mixing of said fuel and air at the shear interface between the two streams is obtained and a stable flame results.

Although the combustion apparatus of this invention is primarily employed in continuous combustion type gas turbine power plants, including stationary as well at jet engine power plants, said combustion apparatus is not limited to said applications but can also be employed in furnaces or similar oil-burning installations employed for other purposes. Since very little smoke is produced, due to the high combustion efficiencies obtained, said combustion apparatus is particularly adapted for employment in congested urban areas where air pollution due to smoke, smog, etc., is a problem. The apparatus can also be employed for carrying out chemical reactions involving combustion.

Various other modifications of this invention will be apparent to those skilled in the art upon study of the accompanying disclosure. Such modifications are believed to be within the spirit and scope of this invention.

I claim:
1. An improved combustor comprising: an elongated flame tube open at its downstream end; a plurality of recesses longitudinally disposed in the upstream end portion of the inner wall of said flame tube and sloping inwardly toward the downstream end of said flame tube and toward the surface of said inner wall; annular fuel inlet means adjacent the upstream end of said flame tube, the downstream opening of said fuel inlet means being directed into said recesses for introducing fuel onto said inner wall and passing said fuel as an annulus in a downstream direction along said inner wall; and air inlet means for introducing and passing a swirling vortex of air coaxially through said flame tube within said annulus of fuel to effect the formation of a shear interface between said fuel and said air so that said fuel burns with an annular flame at said shear interface.

2. A burner comprising: an elongated flame tube open at its downstream end; a plurality of recesses longitudinally disposed in and around the upstream end portion of the inner wall of said flame tube and sloping inwardly toward the downstream end of said flame tube and toward the surface of said inner wall; annular fuel inlet means adjacent the upstream end of said flame tube, the downstream opening of said fuel inlet means being directed into said recesses for injecting and passing an annulus of fuel in a downstream direction in and along the peripheral portion of said flame tube; and air conduit means extending tangentially into the upstream end portion of said flame tube for introducing and passing a swirling stream of air helically along the inner surface of said annulus of fuel to effect the formation of a shear interface between said air and said fuel so that said fuel burns with an annular flame at said shear interface.

3. An improved combustor comprising: an outer shell closed at its upstream end; an elongated flame tube spaced from said outer shell intermediate its ends, closed at its upstream end and open at its downstream end; air inlet means in the upstream end portion of said outer shell; air inlet conduits extending tangentially from the chamber formed between said outer shell and said flame tube into the upstream end portion of said flame tube; a plurality of recesses longitudinally disposed in the upstream end portion of the inner wall of said flame tube and sloping inwardly toward the downstream end of said flame tube and toward the surface of said inner wall; and fuel inlet means opening into said recesses for introducing fuel onto the inner wall of said flame tube.

4. The improved combustor of claim 3 wherein said fuel inlet means comprises at least one fuel inlet conduit terminating in a fuel nozzle, an annulus opening to said inner wall of said flame tube, and fuel conduit means extending between said fuel nozzle and said annulus.

5. An improved combustor comprising: an outer shell closed at its upstream end; an elongated flame tube spaced from said outer shell intermediate its ends, closed at its upstream end and open at its downstream end; air inlet means in the upstream end portion of said outer shell; air inlet conduits extending tangentially from the chamber formed between said outer shell and said flame tube into the upstream end portion of said flame tube; a plurality of recesses longitudinally disposed in the upstream end portion of the inner wall of said flame tube and sloping inwardly toward the downstream end of said flame tube and toward the surface of said inner wall; fuel inlet means opening into said recesses for introducing fuel onto the inner wall of said flame tube; and secondary air conduits extending from the chamber formed between said outer shell and said flame tube into the interior of said flame tube at a point downstream of a primary combustion zone therein.

6. An improved combustor comprising an outer shell closed at its upstream end; an elongated flame tube spaced from said outer shell intermediate its ends, closed at its upstream end and open at its downstream end; a plurality of recesses longitudinally disposed in the upstream end portion of the inner wall of said flame tube and sloping inwardly toward the downstream of said flame tube and toward the inner surface of said inner wall; annular fuel inlet means adjacent the upstream end of said flame tube, the downstream opening of said fuel inlet means opening into said recesses in a downstream direction for injecting and passing an annulus of fuel in a downstream direction limited substantially to longitudinal movement along said inner wall of said flame tube; air inlet means in said outer shell; and air conduit means extending from the chamber formed between said outer shell and said flame tube for tangentially introducing a swirling stream of air into the upstream end of said flame tube and passing same helically along the inner surface of said annulus of fuel to effect the formation of a shear interface between said air and said fuel so that said fuel burns with an annular flame at said shear interface.

7. The combustor of claim 6 wherein said recesses are positioned intermediate said air conduit means.

8. An improved combustor comprising: an outer shell closed at its upstream end; an elongated flame tube spaced from said outer shell intermediate its ends, closed at its upstream end and open at its downstream end; a plurality of recesses longitudinally disposed in and around the upstream end portion of the inner wall of said flame tube and sloping inwardly toward the downstream end of said flame tube and toward the surface of said inner wall; annular fuel inlet means adjacent the upstream end of said flame tube, the downstream opening of said fuel inlet means being directed into said recesses for introducing fuel onto the inner wall of said flame tube and passing said fuel as an annulus along said inner wall in a direction limited substantially to longtuidinal movement; air inlet means in said outer shell; air conduit means extending from the chamber between said outer shell and said flame tube for introducing air into the interior of said upstream end of said flame tube through tangential openings positioned intermediate said recesses and passing said air as a swirling stream within and adjacent said annulus of fuel to effect the formation of a shear interface between said air and said fuel so that said fuel burns with an annular flame at said shear interface.

9. An improved combustor comprising, in combination: a first outer cylindrical shell portion open at each of its ends; a second outer cylindrical shell portion larger in inner diameter through a portion of its length than the inner diameter of said first outer cylindrical shell portion and replaceably connected to the upstream end of said first cylindrical shell portion, the upstream end of said second outer shell portion being closed; an elongated cylindrical flame tube concentrically positioned within and spaced from said outer shell portions, and closed at its upstream end; a plurality of recesses longtiudinally disposed in and around the upstream end portion of the inner wall of said flame tube and sloping inwardly toward the downstream end of said flame tube and toward the surface of said inner wall; annular fuel inlet conduit means adjacent the upstream end of said flame tube, the downstream opening of said fuel inlet means being directed into said recesses for introducing and passing an annulus of fuel in a downstream direction limited substantially to longitudinal movement along said inner wall of said flame tube; air inlet means opening into the enlarged portion of said second outer shell; air conduit means extending tangentially from the chamber formed between said enlarged second outer shell portion and said flame tube into the upstream end portion of said flame tube for introducing a swirling vortex of air into the interior of said flame tube and passing said air through said annulus of fuel to effect the formation of a shear interface between said fuel and said air so that said fuel burns with an annular flame at said shear interface; and secondary air conduit means extending from the chamber formed between said first outer shell and said flame tube into the interior of said flame tube at a point downstream of a primary combustion zone in said flame tube.

10. An improved combustor comprising: an outer shell open at its upstream end; an elongated impervious flame tube open at its downstream end, positioned concentrically within and spaced apart from said outer shell; an annular closure and support member positioned at the upstream end of said outer shell and the upstream end of said flame tube and forming an axially positioned annular space at said upstream end of said flame tube; an igniter extending through said annular closure and support member into said annular space; a pilot fuel inlet conduit also extending through said annular closure and support member into said annular space; a plurality of recesses longitudinally disposed in and around the upstream end portion of the inner wall of said flame tube and sloping inwardly toward the downstream end of said flame tube and toward the surface of said inner wall; fuel inlet conduit means extending means into said annular closure and support member and terminating in an annular chamber within said annular closure and support member adjacent the inner periphery of the upstream end of said flame tube, the downstream opening of said annular chamber being directed into said recesses for introducing and passing an annulus of fuel in a downstream direction limited to substantially longitudinal movement along said inner wall of said flame tube; air inlet means opening into said outer shell; air conduit means extending tangentially from the chamber formed between said outer shell and said flame tube into the upstream end portion of said flame tube for introducing a swirling stream of air into said upstream end of said flame tube axially of said tube and passing same in a swirling helical pattern within and adjacent said annulus of fuel to effect the formation of a shear interface between said air and said fuel so that said fuel burns with an annular flame at said shear interface; and secondary air conduits extending from said chamber between said outer shell and said flame tube into the interior of said flame tube at a point downstream of a combustion zone therein.

11. An improved combustor comprising an outer shell closed at its upstream end; an elongated flame tube spaced from said outer shell intermediate its ends, closed at its upstream end and open at its downstream end; air inlet means in said outer shell; air conduit means extending from the chamber formed between said outer shell and said flame tube to tangentially introduce air into the upstream end of said flame tube; recesses longitudinally disposed in the upstream end of said flame tube and sloping inwardly toward the downstream end of said flame tube and to the inner surface thereof; and fuel inlet means in said recesses directed in a downstream direction.

No references cited.

UNITED STATES PATENT OFFICE
CERTIFICATE OF CORRECTION

Patent No. 3,099,910                                          August 6, 1963

Robert M. Schirmer

It is hereby certified that error appears in the above numbered patent requiring correction and that the said Letters Patent should read as corrected below.

Column 8, line 48, for "longtuidinal" read -- longitudinal --; line 50, after "chamber" insert -- formed --; column 9, line 13, after "air" insert -- inlet --; line 14, after "shell" insert -- portion --; column 9, line 34, strike out "means".

Signed and sealed this 25th day of February 1964.

(SEAL)
Attest:
ERNEST W. SWIDER

Attesting Officer

EDWIN L. REYNOLDS

Acting Commissioner of Patents